F. HACHMANN.
HOSE COUPLING.
APPLICATION FILED JAN. 30, 1919.

1,354,480.

Patented Oct. 5, 1920.

Inventor
Frederick Hachmann
by Edward E. Longan
Atty.

UNITED STATES PATENT OFFICE.

FREDERICK HACHMANN, OF ST. LOUIS, MISSOURI, ASSIGNOR OF ONE-EIGHTH TO DAVID M. HUTCHINSON, OF FERGUSON, MISSOURI.

HOSE-COUPLING.

1,354,480.  Specification of Letters Patent.  Patented Oct. 5, 1920.

Application filed January 30, 1919. Serial No. 274,133.

*To all whom it may concern:*

Be it known that I, FREDERICK HACHMANN, a citizen of the United States, and resident of the city of St. Louis and State of Missouri, have invented certain new and useful Improvements in Hose-Couplings, of which the following is a specification containing a full, clear, and exact description, reference being had to accompanying drawings, forming a part thereof.

My invention relates to new and useful improvements in hose couplings, the primary object of which is to construct a hose coupling composed of a male and female member which may be readily attached to hose sections to afford a coupling for the same without special tools or wire.

A further object is to provide a hose coupling having the end, which is to be inserted in a hose, formed similar to a hose mender and means for securing the coupling and hose together.

Figure 1:
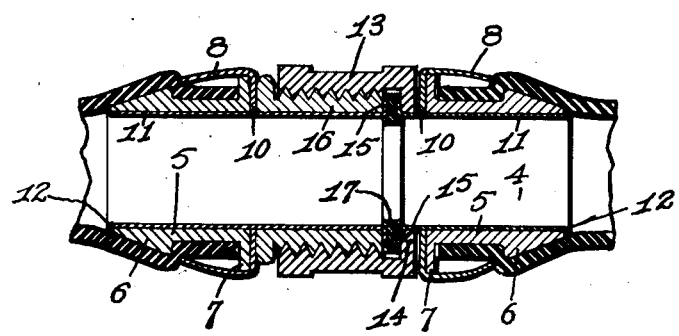
Figure 1 is a longitudinal section of my hose coupling applied to hose sections.
Figure 2:
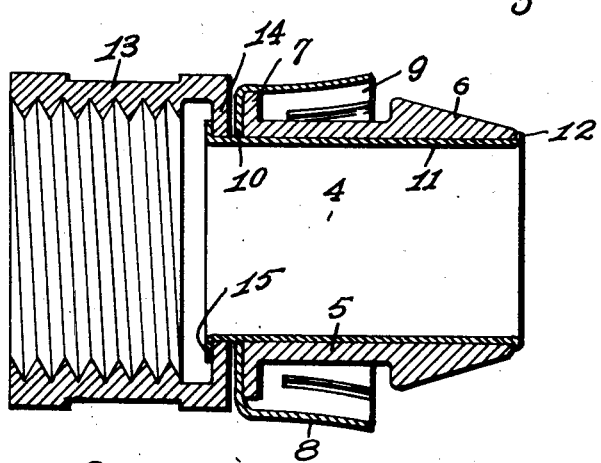
Fig. 2 is an enlarged longitudinal sectional view of the female coupling detached from the hose.
Figure 3:
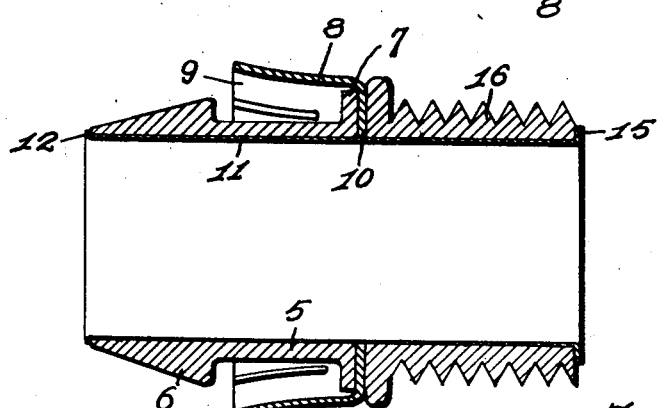
Fig. 3 is a similar view of the male end of the coupling detached from the hose.

Referring to the drawings, 4 indicates the female coupling member which is composed of a sleeve 5 having at one end a shoulder 6, which is to be inserted in the hose section, and at its opposite end the flange 7. Mounted on the flange 7 is a cup-shaped clamping member 8 provided with the clamping prongs 9 for clamping the hose sections. The cup-shaped member 8 is provided with a flange 10 abutting against the flange 7 of the sleeve 5. 11 indicates a tubular sleeve which is inserted through the sleeve 5 and one end of which is flanged over the front end of the sleeve 5, as at 12. Mounted on the other end of the tubular sleeve 11 is an internally screw-threaded coupling 13, provided with an internal flange 14. The tubular sleeve 11 is turned or flanged over the flange 14 as at 15, and by means of this construction, the sleeve 5, clamping member 8 and the internally screw-threaded member 13 are held together.

The male member of the coupling comprises a similar sleeve to be inserted in a hose section and a clamping member to which, and by the same method of construction, the externally screw-threaded member 16 of the male member is secured, that is to say, the male member is composed of a similar sleeve 5 having a shoulder 6, a flange 7, a clamping member 8, and an externally screw-threaded member 16 all held together by means of a similar tubular sleeve 11. The internally screw-threaded rotating member 13 is loosely secured to the sleeve 5 by flanging the end of the tubular sleeve 11 over the flange 14 and the externally screw-threaded member 16 is secured to the sleeve 5 of the other coupling member by means of a similar tubular sleeve 11.

In the operation of my device, the free ends of the sleeves 5 are inserted into the hose sections and by means of a hammer or any other instrument the prongs 9 are bent down and engage the exterior surfaces of the hose in front of the shoulder 6, thus firmly securing both sections of the hose to both coupling members. If it is desirable to remove the hose sections, this may be accomplished by inserting a screw driver into the slot between the prongs 9 and prying them upward. As previously pointed out, the coupling 13 of the two members is mounted on the sleeve 11, so as to freely rotate contemplating the use of a washer 17 between the flanged end 15 of the tubular member 11 and the end of the screw-threaded member 16.

Having fully described my invention, what I claim is:

1. A hose coupling composed of two members, one of said members comprising a sleeve, a shoulder carried by said sleeve, an externally screw threaded member secured to said sleeve, a clamping member provided with bendable prongs secured to said sleeve between the shoulder and externally screw threaded member, and the other member of the coupling comprising a sleeve, a shoulder mounted on said sleeve, an internally screw threaded rotating member mounted on said sleeve, and a hose clamping member provided with bendable prongs secured to said sleeve between the shoulder carried thereby and the internally screw threaded rotating member.

2. A hose coupling composed of a male and female member, the female member comprising a sleeve one end of which is adapted to be inserted in a hose section, shoulders formed on the end of said sleeve, a flange formed on the opposite end of said sleeve, a cup shaped member provided with tongues mounted on said flange, an internally screw threaded coupling member provided with an internal flange and a tubular sleeve located within and extending through the first mentioned sleeve and into the internally screw threaded member, said sleeve being flanged at both its ends for holding said parts together, a male member comprising a sleeve adapted to be inserted in the end of a hose section and provided with shoulders and an external flange, a cup shaped member provided with tongues mounted on said flange, an externally screw threaded member and a tubular sleeve passing through the externally screw threaded member having flanged ends for holding said externally screw threaded member, the cup shaped clamping member and the sleeve together.

In testimony whereof I have signed my name to this specification, in presence of two subscribing witnesses.

FREDERICK HACHMANN.

Witnesses:
ELIZABETH CARTALL,
WALTER C. STEIN.